United States Patent
Kwak (10) Patent No.: US 10,421,184 B2
(45) Date of Patent: Sep. 24, 2019

(54) MAGNETIC STORAGE SYSTEM

(71) Applicant: Jeffrey Kwak, Gainesville, VA (US)

(72) Inventor: Jeffrey Kwak, Gainesville, VA (US)

( * ) Notice: Subject to any disclaimer, the term of this patent is extended or adjusted under 35 U.S.C. 154(b) by 355 days.

(21) Appl. No.: 15/183,815

(22) Filed: Jun. 16, 2016

(65) Prior Publication Data

US 2017/0360196 A1    Dec. 21, 2017

(51) Int. Cl.
| | |
|---|---|
| *B25H 3/04* | (2006.01) |
| *A47F 5/08* | (2006.01) |
| *A47B 57/06* | (2006.01) |
| *F16B 1/00* | (2006.01) |
| *A47B 96/20* | (2006.01) |
| *F16B 11/00* | (2006.01) |

(52) U.S. Cl.
CPC ............ *B25H 3/04* (2013.01); *A47B 57/06* (2013.01); *A47F 5/0807* (2013.01); *A47B 2096/209* (2013.01); *F16B 11/006* (2013.01); *F16B 2001/0028* (2013.01); *F16B 2001/0035* (2013.01)

(58) Field of Classification Search
CPC .. A47B 81/005; A47B 2096/209; B25H 3/04; F16B 1/00; F16B 47/003; F16B 2001/0028; F16B 2001/0035; A47G 2200/10; A47G 1/17; A47G 2001/0672; A47G 2009/004; A47G 2023/0666; A47G 2200/103; A47G 2200/106; Y10S 211/01; Y10T 24/32; Y10T 24/4026; Y10T 24/406; A47F 5/08

USPC ........... 211/87.01, DIG. 1, 41.9; 206/818; 248/683, 206.5, 309.4, 350; 24/303; 220/483

See application file for complete search history.

(56) References Cited

U.S. PATENT DOCUMENTS

| | | | | |
|---|---|---|---|---|
| 358,193 | A * | 2/1887 | Gause | B60R 1/12 248/114 |
| 933,500 | A * | 9/1909 | Towle | G09F 7/22 24/546 |
| 2,164,623 | A * | 7/1939 | Posner | A45D 8/185 132/331 |
| 2,176,052 | A * | 10/1939 | Beyer | A44C 5/0046 132/331 |
| 2,866,559 | A * | 12/1958 | Byrne | A47G 25/005 211/35 |
| 3,174,714 | A * | 3/1965 | Bradsby | A47F 5/08 211/1 |
| 3,204,776 | A * | 9/1965 | Brown | B25H 3/04 211/70.6 |

(Continued)

*Primary Examiner* — Jennifer E. Novosad
(74) *Attorney, Agent, or Firm* — Jonathan Brown (57) ABSTRACT

A Magnetic Storage System is disclosed. The Magnetic Storage System is generally comprised of a magnetic securing apparatus and magnetically attracted surface. The magnet sets comprising an appropriate number of magnets which may be secured to a strap arrangement. A Magnetically attracted surface is secured to a suitable location such as a wall. At least one object is then magnetically secured to the magnetically attracted surface with the magnetic securing apparatus. The magnets of the magnetic securing apparatus secure magnetically to the magnetically attracted surface, thereby securing the object(s). When objects are so secured, they are clearly visible, making them easy to find. When a user needs a secured object, the user simply detaches the object from the magnetically attracted surface.

7 Claims, 8 Drawing Sheets

(56) References Cited

U.S. PATENT DOCUMENTS

| | | | | |
|---|---|---|---|---|
| 3,289,338 A * | 12/1966 | Stephens | A47F 5/08 | 248/206.4 |
| 3,842,688 A * | 10/1974 | Baginski | B62M 3/083 | 24/16 PB |
| 3,886,508 A * | 5/1975 | Lavrard | A45F 5/00 | 335/285 |
| 4,148,424 A * | 4/1979 | Fortenberry | B43K 23/001 | 15/443 |
| 4,453,933 A * | 6/1984 | Speaker | A61M 25/02 | 128/877 |
| 4,494,661 A * | 1/1985 | Krusche | A47B 96/061 | 211/87.01 |
| 4,542,051 A * | 9/1985 | Cirimele | B44C 3/12 | 40/489 |
| 4,606,484 A * | 8/1986 | Winter | A46B 5/00 | 224/218 |
| 4,671,415 A * | 6/1987 | Manhart | A47F 7/02 | 211/40 |
| 4,826,059 A * | 5/1989 | Bosch | A45C 11/24 | 206/350 |
| 4,953,714 A * | 9/1990 | Paul | A47F 5/0884 | 211/36 |
| 4,979,625 A * | 12/1990 | Johnson | A47G 1/0616 | 211/85.9 |
| 5,018,232 A * | 5/1991 | Sachetti | A47C 27/002 | 5/482 |
| 5,056,661 A * | 10/1991 | Balzano | B25F 5/029 | 206/350 |
| 5,137,158 A * | 8/1992 | Brockway | B60R 7/02 | 211/106.01 |
| 5,168,986 A * | 12/1992 | Stenhouse | A47F 7/02 | 206/45.24 |
| 5,294,008 A * | 3/1994 | Dunaway | A47L 15/505 | 211/41.9 |
| 5,384,999 A * | 1/1995 | Roche | G09F 7/04 | 40/600 |
| 5,390,800 A * | 2/1995 | Tucker | A47F 5/0807 | 206/495 |
| 5,460,305 A * | 10/1995 | Ahearn | B25H 5/00 | 211/DIG. 1 |
| 5,601,198 A * | 2/1997 | Reed | A47B 96/02 | 211/180 |
| 5,671,849 A * | 9/1997 | Bacon | A47F 7/02 | 206/6.1 |
| 5,680,928 A * | 10/1997 | Carr | A45C 11/16 | 206/6.1 |
| 5,695,380 A * | 12/1997 | Morrison | A63H 3/36 | 446/268 |
| 5,800,106 A * | 9/1998 | Miller | B60P 7/0807 | 24/303 |
| 5,849,390 A * | 12/1998 | Dillon | B60R 7/00 | 428/99 |
| 5,950,815 A * | 9/1999 | Yetman-Bellows | A47F 7/02 | 206/6.1 |
| 5,957,308 A * | 9/1999 | Zierenberg | A47B 81/005 | 211/118 |
| 6,587,022 B1 * | 7/2003 | Devine | A45F 5/00 | 206/350 |
| 6,626,303 B1 * | 9/2003 | Moodie | A47F 5/0807 | 211/70.7 |
| 6,729,520 B2 * | 5/2004 | Gilbert | A45F 3/14 | 224/219 |
| 6,910,578 B2 * | 6/2005 | Stern | B25H 3/003 | 206/350 |
| 7,007,421 B2 * | 3/2006 | Kirschhoffer | G09F 3/20 | 248/316.7 |
| 7,059,073 B2 * | 6/2006 | Beach | G09F 1/10 | 206/495 |
| 7,073,672 B2 * | 7/2006 | Sholem | B25H 3/04 | 211/70.6 |
| 7,806,255 B1 * | 10/2010 | Staver | A45C 11/16 | 206/6.1 |
| 8,151,980 B2 * | 4/2012 | DeMartino | A47G 29/08 | 206/495 |
| D667,246 S * | 9/2012 | Cittadino | D6/513 | |
| 8,387,783 B2 * | 3/2013 | Zack | A47K 3/001 | 206/77.1 |
| 8,793,846 B2 * | 8/2014 | d'Auriac | A41D 27/08 | 24/303 |
| 9,224,315 B2 * | 12/2015 | Donat | G09F 1/12 | |
| 9,517,655 B2 * | 12/2016 | Manach | B44C 5/02 | |
| 9,759,516 B2 * | 9/2017 | Feris | F41C 33/06 | |
| 9,918,551 B2 * | 3/2018 | Hilliard | F16B 2/26 | |
| 2005/0230336 A1 | 10/2005 | Mundy | A47B 43/00 | 211/113 |
| 2006/0113344 A1 * | 6/2006 | Cragg | A45F 5/02 | 224/579 |
| 2006/0151409 A1 * | 7/2006 | Schmoelzer | A47G 25/06 | 211/85.9 |
| 2006/0196841 A1 * | 9/2006 | Price | A47F 5/00 | 211/86.01 |
| 2008/0115332 A1 * | 5/2008 | Kopp | A45C 13/02 | 24/3.7 |
| 2009/0039122 A1 * | 2/2009 | Antonioni | A45C 13/02 | 224/250 |
| 2010/0102015 A1 * | 4/2010 | Benneche | A47B 97/00 | 211/183 |
| 2012/0097831 A1 * | 4/2012 | Olukotun | F16M 11/041 | 248/688 |
| 2013/0068919 A1 * | 3/2013 | Antonioni | F16M 13/00 | 248/614 |
| 2014/0263116 A1 * | 9/2014 | Wojciechowski | A47F 5/0807 | 211/85.2 |
| 2015/0133029 A1 * | 5/2015 | Casey-Mederios | A47G 25/18 | 450/52 |
| 2015/0289699 A1 * | 10/2015 | Gallup | A47G 29/10 | 211/175 |
| 2016/0140884 A1 * | 5/2016 | Hall | G09F 15/00 | 211/45 |
| 2017/0231388 A1 * | 8/2017 | Will | A47B 95/008 | 211/106 |
| 2017/0360196 A1 * | 12/2017 | Kwak | A47B 81/005 | |

\* cited by examiner

MAGNETIC STORAGE SYSTEM

CROSS REFERENCE TO RELATED APPLICATION(S)

This application claims the benefit of U.S. Provisional Application No. 62/215,307 entitled "Mag Wraps," filed on Sep. 8, 2015, the subject matter of which is hereby incorporated therein by reference in its entirety.

TECHNICAL FIELD OF THE INVENTION

The present invention relates to the general art of storage and more specifically to systems and methods for accessible storage of multiple items.

BACKGROUND OF THE INVENTION

Ways to store objects that are frequently used and/or need to be easily accessible are known, but tend to require a good deal of installation hardware, work, and lack flexibility. For example, it is frequently desirous to store tools in a way in which they can be seen and easily accessed for use.

Typically, a rack or pegboard is used, into which a set of hooks or is screwed. However, this storage solution requires a good deal of hardware and can be difficult to install. Further, once hooks or other tool fastening devices are screwed in or otherwise set, changing their configuration on the pegboard or rack to accommodate different tools or arrangement of tools can be difficult and take a good deal of effort. If the hooks or other holders are secured firmly, removing them to change their location may damage them or board, wall or rack they are secured to.

Visible storage for toys is even more problematic. Currently, toys, such as, for example, toy guns that fire foam projectiles are typically stored in a box or other container. This can make them difficult to see or find. A child may forget what toys they have or at the least, have difficulty locating them. This can mean toys to not get used as they should, or even are purchased multiple times. Toys can also become damaged as children search containers for them, pull them out as they collide with other toys within the container, or even turn over the container, scattering toys, to locate a particular toy. If toys, tools or other objects that are accessed routinely, quickly or both are left out for easier access (or simply because there is no suitable place for them), the space around them can quickly become cluttered and annoying or difficult to navigate.

What is needed is a system and method that addresses these issues, providing storage of items in a new and novel way that makes the items visible and easily accessible, yet is flexible enough to allow a user to easily change the configuration of storage.

SUMMARY

A Magnetic Storage System is disclosed herein. The Magnetic Storage System is generally comprised of a magnetic securing apparatus and magnetically attracted surface. The Magnetic Storage System can have any suitable number of magnetic securing apparatus and the respective magnetic securing apparatus can be of any suitable size and shape, and arranged in any suitable configuration for securing objects.

In one preferred embodiment, each magnetic securing apparatus is comprised more specifically of a wrap arrangements and magnet sets. The magnet sets comprise at least a pair of magnets that are secured to the wrap arrangements by any suitable means in the art. The magnets of the magnet sets can be any suitable number and placement for securing the wrap arrangement.

A Magnetically attracted surface is secured to a suitable location such as a wall by securing apparatus. The magnetic surface can be comprised of any suitable material known in the art capable of holding magnets, such as a sheet of steel or a sheet of non-magnetic material painted with a magnetically attractive coating. The magnetically attracted surface can be any suitable size and shape, depending on factors such as available surface area and size and number of objects to be stored. The securing apparatus can be comprised of any suitable means known in the art capable of securing the magnetically attracted surface to a wall. in one preferred embodiment, the securing apparatus is a set of screws capable of being fitted into a set of pre-drilled holes in the magnetically attracted surface.

Magnetic securing apparatus are each used to secure one or more objects. The respective wrap arrangements are comprised, in one preferred embodiment, of a web of straps that can be comprised of any suitable material in the art such as, nylon or other plastic or resin, cloth, gel or rubber or rubberized straps.

At least one object is placed between each wrap arrangement and the magnetically attracted surface. The magnets of the magnetic securing apparatus secure magnetically to the magnetically attracted surface, thereby securing the secured objects between each respective wrap arrangements and the magnetically attracted surface. When objects are so secured, they are clearly visible, making them easy to find. When a user needs a Secured Object, the user simply detaches the appropriate magnetic securing apparatus from the magnetically attracted surface, thereby gaining ready access to any secured object.

Wrap arrangements can be in any suitable size, length or shape for securing appropriately sized objects. Wrap arrangements can be comprised, for example of a webbing arrangement with magnets at the edges, or of a pair of straps, each attached to a pair of magnets, wherein the pair of straps are placed about each secured object in a cradling configuration.

The magnets of the magnetic securing apparatus are secured to the magnetically attracted surface, thereby holding each secured object. magnetic securing apparatus of any suitable size or configuration can be added, or can be taken away, depending on the number and configuration of objects to be stored.

In one embodiment, the secured objects are a series of toys, but the Magnetic Storage System can be used to store other types of objects such as tools, or other types of supplies.

The system has the advantages that it can be easily set up in practically any environment with an available flat surface, and the storage configuration easily added to, reduced or changed by simply making suitable changes to the magnetic securing apparatus.

In another embodiment of the invention, one or more magnets of a magnet set comprised of one or more magnets are affixed directly to one side of each object to be secured by any suitable means in the art. The magnet(s) comprising each magnet set can be of any suitable size, number, and placement on the object suitable for securing the object.

Each item to be secured is placed upon the magnetically attracted surface, securing the object to the surface. When a user needs any of the secured objects the user simply detaches the appropriate secured objects from the magnetically attracted surface.

A set of alternative embodiments for securing a band or bands to the magnetically attractive surface is also shown.

Several embodiments feature a magnetic securing apparatus with a band or strap configuration that is comprised of a magnet secured to a band. The magnet is typically secured at approximately the center of the band and on each respective end of the band are, in several embodiments are components of securing means that allow ends of the band to be secured together.

In one embodiment, a buckle is provided at one end of the band and a number of holes are provided at the other end.

In these embodiments, the number of magnetic securing apparatus, or the size of the securing apparatus and/or magnets used can be altered depending on factors such as the size, shape, and weight of an object to be secured. The respective bands are secured about the object and the magnets are positioned facing the magnetically attractive surface as in other embodiments herein. The magnets are secured against the magnetically attractive surface thereby securing the object.

In another embodiment, instead of having a buckle for securement, at least one pin protruding from one end of a band and at least one hole at the opposite end of the band are provided for securing the band about an object.

In another embodiment, a pair of U-shaped bars are provided on the underside of the magnet on each respective side of the magnet. The band is threaded through the U-shaped bars thereby securing the magnet to the band.

In a further sample embodiment, the magnet can have a U-shaped channel along the underside of the magnet facing the band. The band can be placed within the u-shaped channel, allowing for a snug fit between the band and magnet.

In yet another sample embodiment, one respective end of the band can be threaded through a buckle mechanism at the other end of the band, upon which the buckle is clamped or otherwise secured.

In another embodiment for securing a band, webbing, elongated straps or other suitable configurations, a block is provided. The block has a gap or channel at or in proximity to a lower side of the block, and at least one magnet at the upper end of the block relative to the lower end. The block magnet may be attached to the block, incorporated into the block, or secured or build in by other means. The band can be placed snugly within the gap and the block magnet attached to the magnetically attractive surface, securing the band, and an object secured by the band, to the magnetically attractive surface.

Hereby disclosed is a device for fast and easy storage of objects such as toys, tools or other suitable objects or sets of objects that allows the object(s) to be easily found and detached for use.

DETAILED DESCRIPTION OF PREFERRED EMBODIMENTS

Other objects, features and advantages of the invention will become apparent from a consideration of the following detailed description and the accompanying drawings. The following descriptions are made referring to the figures, wherein like reference numbers refer to like features throughout this description. Not all numbers appearing in one figure are necessarily present in another.

Figure 1:
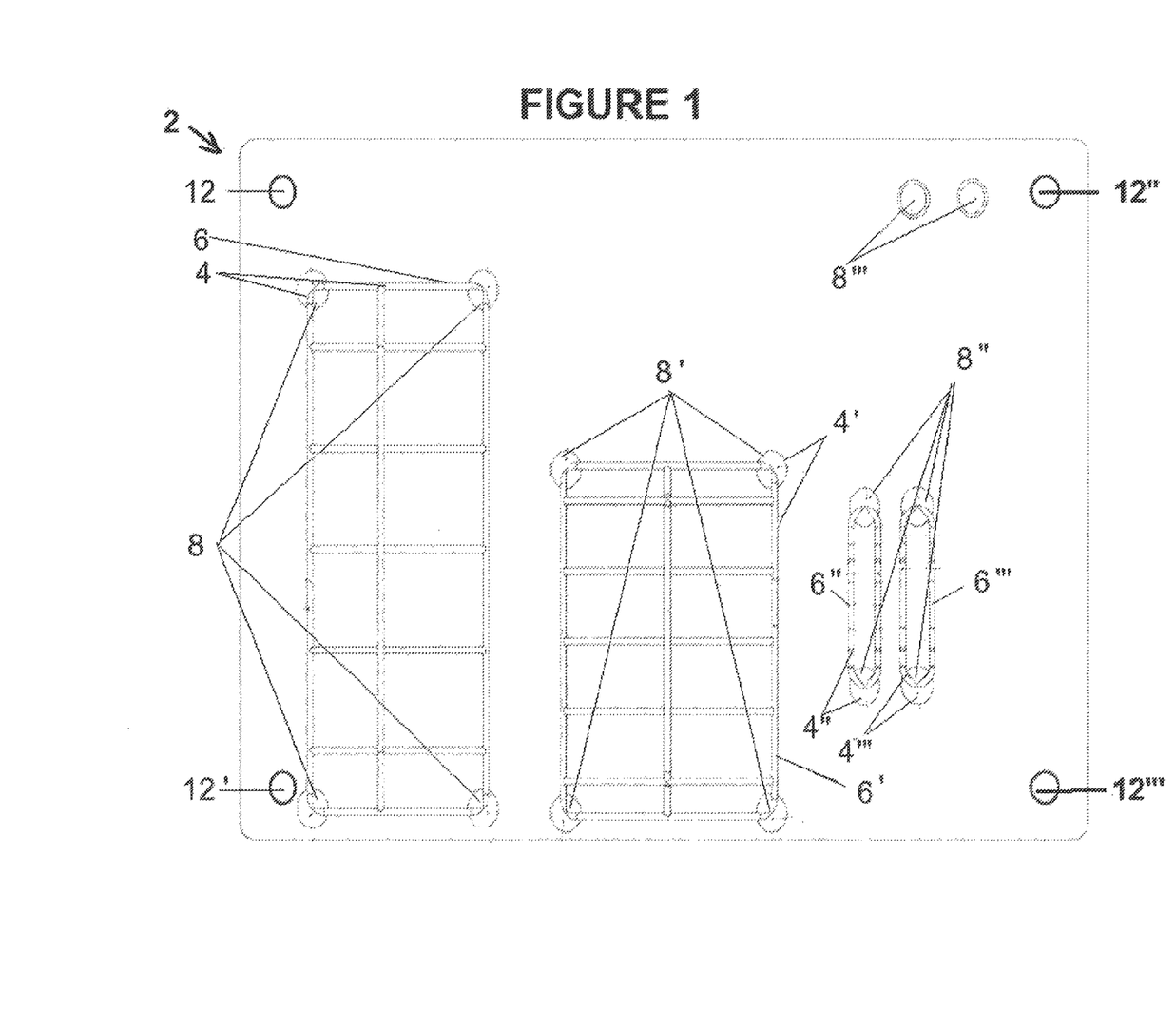
FIG. 1 is a schematic perspective view of a preferred embodiment of the invention with a cutaway portion of a wall shown.

Turning first to FIG. 1, a Magnetic Storage System 2 is shown and featured. The Magnetic Storage System 2 is comprised generally of a magnetic securing apparatus 4 and magnetically attracted surface 10. The Magnetic Storage System 2 can have any suitable number of Magnetic securing apparatus, represented here as 4, 4', 4." As shown, the respective magnetic securing apparatus 4, 4', 4" can be of any suitable size and shape, and arranged in any suitable configuration.

Each Magnetic securing apparatus 4, 4', 4" is comprised more specifically of respective wrap arrangements, represented herein as 6, 6', 6" and magnet sets represented herein as 8, 8',8". Each magnet set 8, 8', 8" is comprise of at least a pair of magnets that are secured to each wrap arrangement 6, 6', 6". The magnet sets 8, 8', 8" are secured to the wrap arrangements 6, 6', 6" by any suitable means in the art. Each magnet set 8, 8', 8" can, for example, be secured with adhesive, clips, hook and loop, screws passing through the wrap arrangements 6, 6', 6" or other suitable means. In this embodiment, each magnet set 8, 8', 8" is secured by screws in pre-arranged threaded holes in the Magnet sets 8, 8', 8". The magnets of the magnet sets 8, 8', 8" can be of any suitable size, number, and placement for securing the wrap arrangement 6, 6', 6" depending on such factors as the size, weight and number of the object(s) to be secured.

A magnetically attracted surface 10 is secured to a suitable location such as a wall 14 (shown here in cutaway) by securing apparatus 12, 12', 12", 12". The magnetically attracted surface 10 can be comprised of any suitable material known in the art capable of holding magnets, such as a sheet of steel, other magnetically attractive material, or a sheet of non-magnetic material painted with a magnetically attractive coating.

The magnetically attracted surface 10 can be any suitable size and shape, depending on factors such as available surface area and size and number of objects to be stored. The securing apparatus 12, 12', 12", 12" can be comprised of any suitable means known in the art capable of securing the magnetically attracted surface 10 to a wall 14, such as, for example, screws, anchors, pins adhesive strips, tap welds (if appropriate) or hook and loop fasteners. In this embodiment, the Securing Apparatus 12, 12', 12', 12" is a set of screws capable of being fitted into a set of pre-drilled holes in the Magnetically attracted surface 10.

Figure 2:
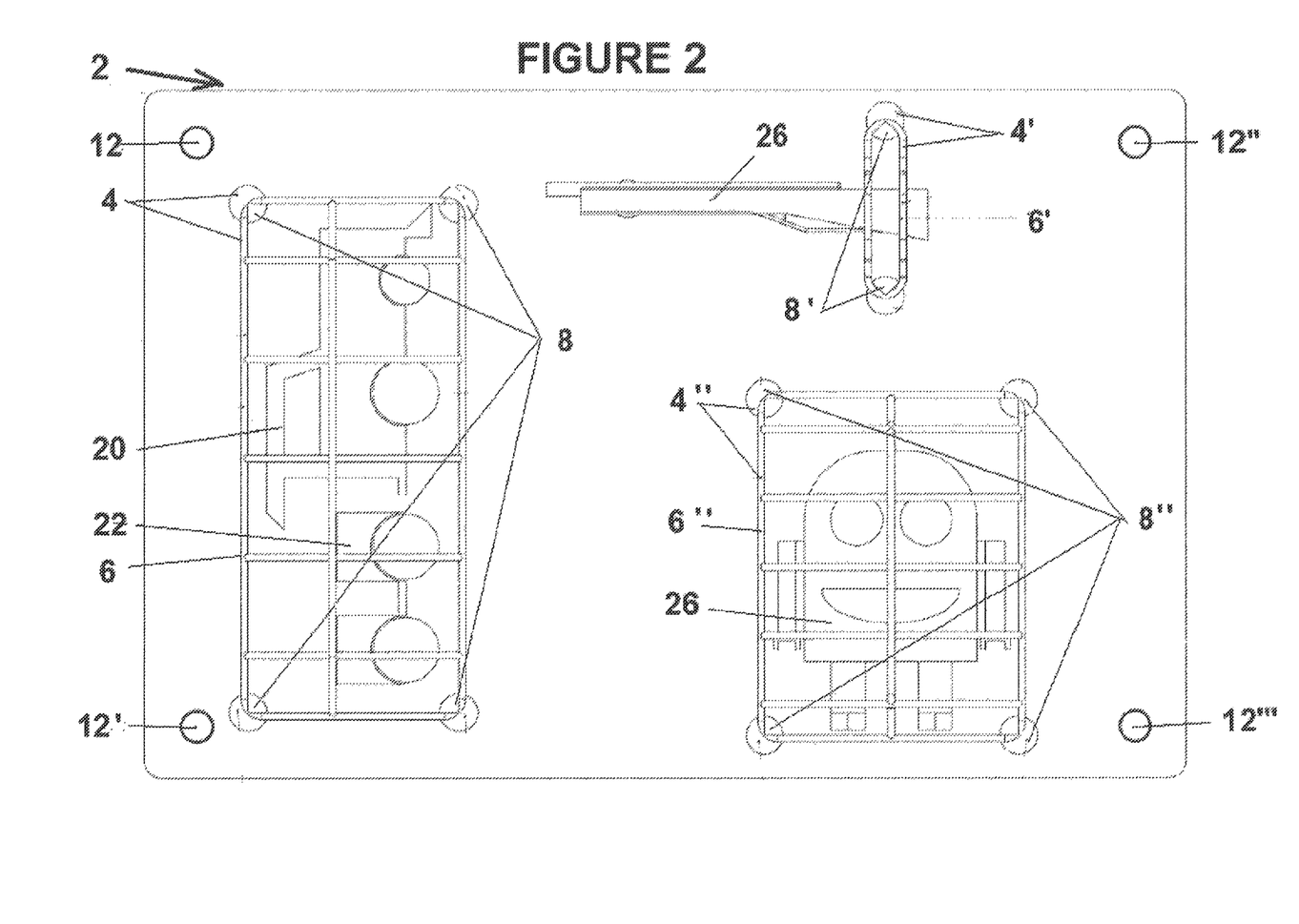
FIG. 2 is a schematic front view of the embodiment of FIG. 1, showing the invention in use.

Turning to FIG. 2, the device is shown in use. Magnetic securing apparatus 4 and 4' are each used to secure one or more objects. Each respective wrap arrangement 6, 6' is comprised, in this embodiment, of a web of straps that can be comprised of any suitable material in the art such as, nylon or other plastic or gel, cloth, rubber or rubberized material, or gel. At least one object, here represented by pairs of secured objects 1-2, denoted 20, 22 and 2-4, denoted 24, 26, are placed between the wrap arrangements 6, 6' and the magnetically attracted surface 10.

The magnets of the magnetic securing apparatus 4 and 4' secure magnetically to the magnetically attracted surface 10, thereby securing the secured objects 20, 22, 24, 26 between each respective wrap arrangement 6, 6' and each respective magnetically attracted surface 10. By this means, the secured objects 20, 22, 24, 26 are clearly visible, making them easy to find.

When a user needs a secured object 20, 22, 24, 26, the user simply detaches the appropriate magnetic securing apparatus 4, 4' from the Magnetically attracted surface 10, thereby gaining ready access to any of the Secured Objects 20, 22, 24, 26.

Wrap arrangements can be in any suitable size, length or shape for securing appropriately sized objects, depending on factors such as the weight, and size of the object or objects to be secured 20, 22, 24, 26.

To illustrate the versatility of the wrap arrangement configuration, one wrap arrangement 6" and respective magnetic securing apparatus 4" is comprised of a pair of straps, each attached to a pair of magnets, rather than the previous web arrangement. The pair of straps of the wrap arrangement 6" are placed about the secured object 28 in a cradling configuration. The magnets of the magnetic securing apparatus 4" are secured to the magnetically attracted surface 10, thereby holding the secured object 28. Magnetic securing apparatus of any suitable size or configuration can be added, or can be taken away, depending on the number and configuration of objects to be stored.

Figure 3:
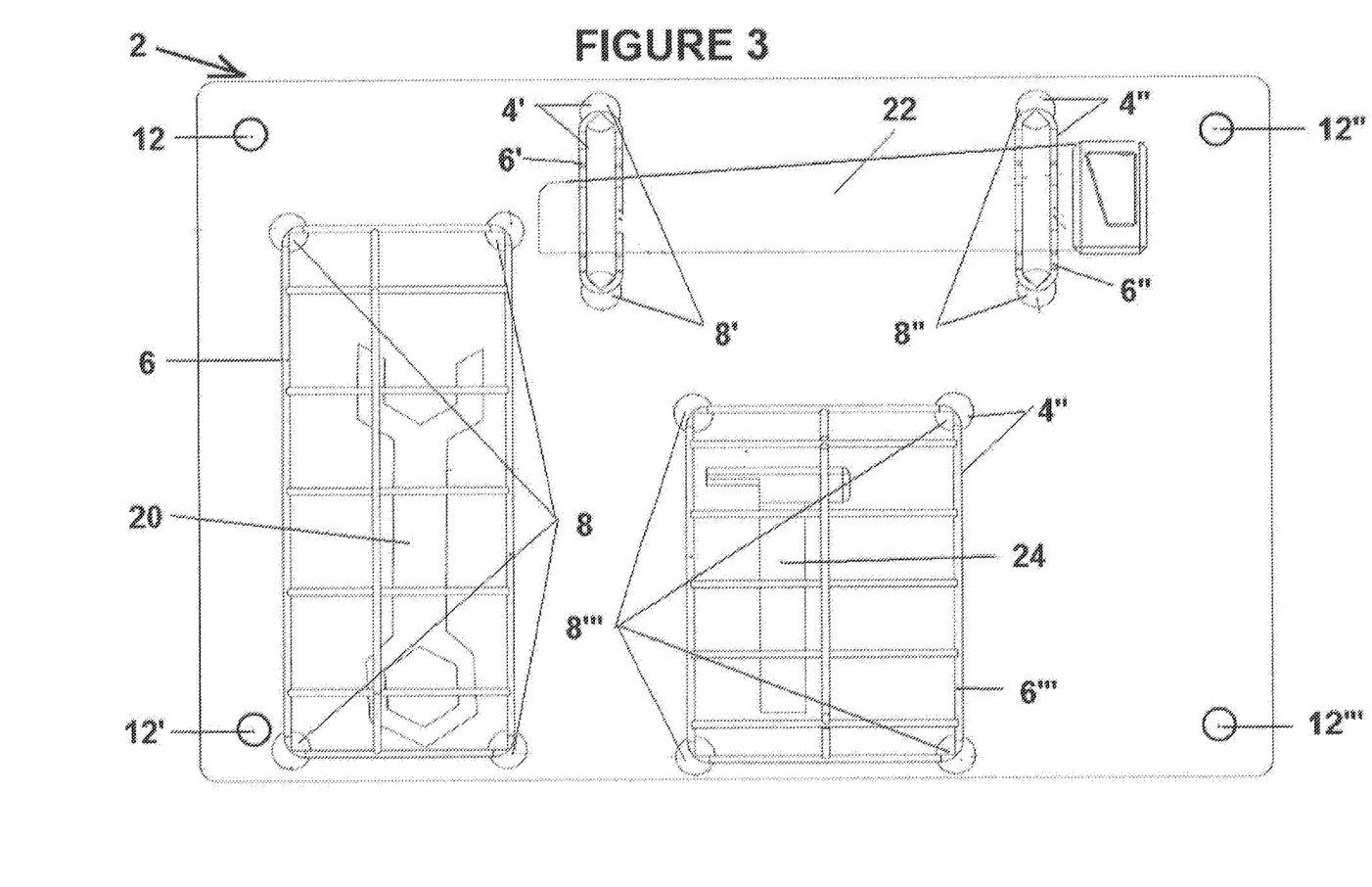
FIG. 3 is a schematic front view of the embodiment of FIG. 1 showing the invention in a use different to that shown in FIG. 2.

In this embodiment, the secured objects 20, 22, 24, 26, 28 are a series of toys, but storage of other types of objects is also possible. For example, turning briefly to FIG. 3, a configuration wherein a first through fifth representative secured objects 20', 22', 24', 26', 28' are a set of tools is shown. The system 2 has the advantages that it can be easily set up in practically any environment with an available flat surface, and the storage configuration easily added to, reduced or changed by simply making suitable changes to the magnetic securing apparatus 4."

Figure 4:
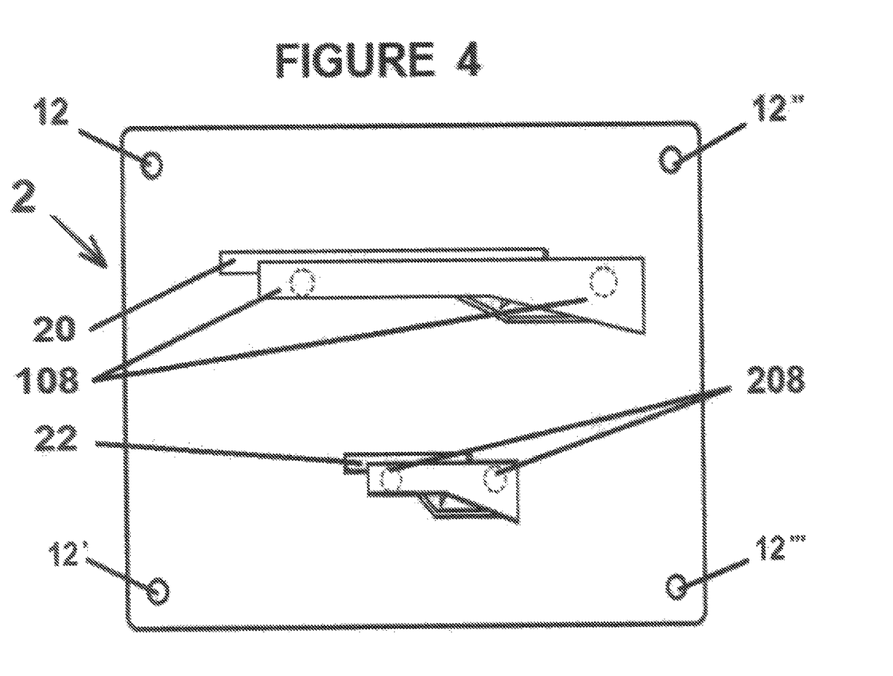
FIG. 4 is a schematic front view of another preferred embodiment of the invention

Turning to FIG. 4, another embodiment of the invention is shown. Representative objects to be secured 20, 22, are provided. One or more magnet sets, represented here as 108, 208, are provided, each set comprised of one or more magnets. As the magnetic securing apparatus are, in this embodiment, comprised of the magnet sets 108, 208, which are already numbered, the magnetic securing apparatus is not numbered herein to prevent duplication.

The one or more magnets of the magnet sets 108, 208 are affixed to one side of the object 20, 22. The magnet(s) comprising each magnet set 108, 208 can be of any suitable size, number, and placement on the object 20, 22 suitable for securing the object 20, 22. Each magnet set 108, 208 can be affixed to the object by means known in the art, either during or after manufacture, ways including, but not limited to, an epoxy or resin, glue, other adhesive substance, fusing the magnets to the objects 20, 22 and fastening with fastening systems such as hook and loop.

Each item to be secured 20, 22 is placed upon the surface 10 with the side of each object 20, 22 having the magnets placed against the surface 10. The objects 20, 22, are magnetically secured to the surface. Thus magnetically secured, the objects, 20, 22, as in the previous embodiment, are clearly visible, making them easy to find. When a user needs any of the secured objects 20, 22, the user simply detaches the appropriate secured object 20, 22 from the magnetically attracted surface 10. Though the secured objects 20, 22 can each be any suitable object, they are, in this embodiment, toys and more specifically, a set of toy guns using foam darts.

Figure 5:
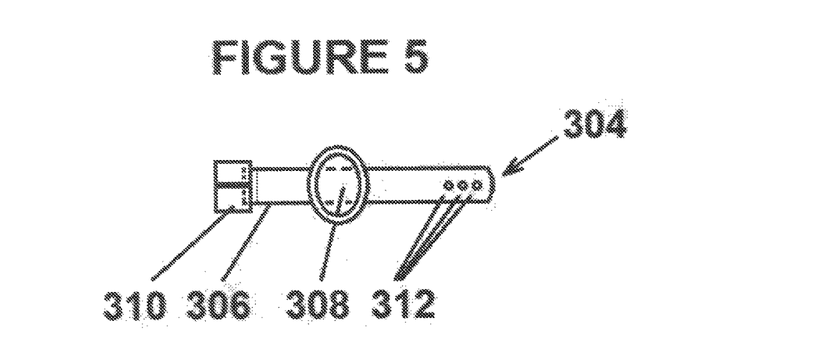
FIG. 5 is a schematic top plan view of a portion of another embodiment of the invention.
Figure 5A:
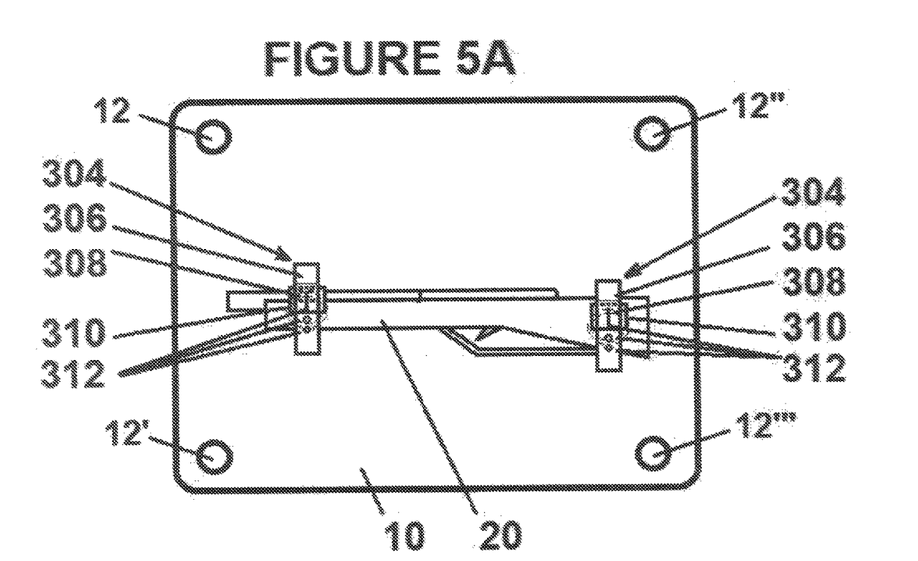
FIG. 5A is a schematic front view of the embodiment of FIG. 5 in use.
Figure 5B:
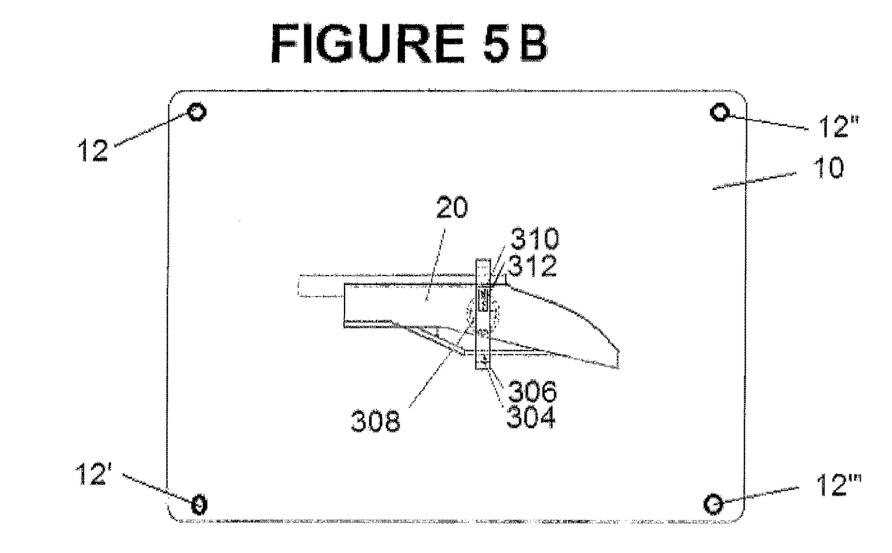
FIG. 5B is a schematic front view of a further embodiment of the invention in use.
Figure 6:
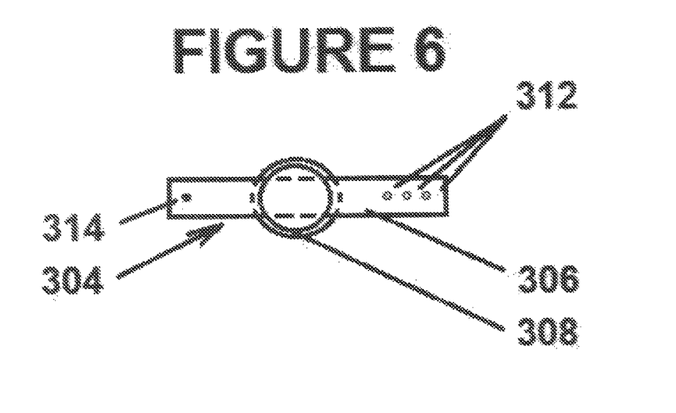
FIG. 6 is a schematic top plan view of a portion of another embodiment of the invention.
Figure 6A:
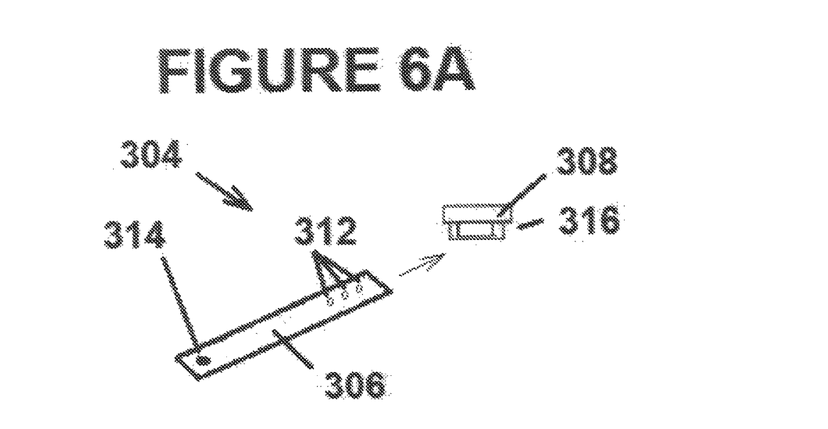
FIG. 6A is a partial perspective view of the embodiment represented by FIG. 6.
Figure 7:
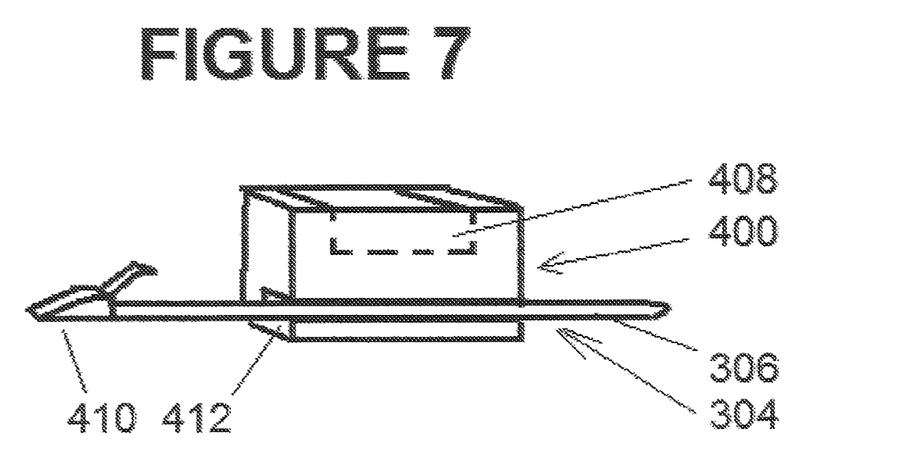
FIG. 7 s a schematic perspective view of a portion of another embodiment of the invention.

Turning to FIGS. 5-7, a sample of alternate embodiments for securing items to the magnetically attracted surface 10 are shown.

Turning first to FIG. 5, an embodiment featuring a magnetic securing apparatus with a band or strap configuration 304 (referred to herein as "band") is shown. It is comprised of a magnet 308 secured to a band 306. The band 306, as is true of the bands shown depicted in all the embodiments herein, can be comprised of any material named herein for banding or strapping material including, but not limited to nylon or other plastic or resin, rubber or rubberized material, cloth, or gel. Likewise, the magnet, as each magnet in the embodiments herein, is a magnet as described herein and understood within the art, and is comprised of any magnetic material(s) known in the art.

The magnet 308 is secured to the band 306 by any suitable means in the art and/or means described herein. The magnet 304, as in other embodiments, is typically secured at approximately the center of the band 306 and, in several embodiments, on each respective end of the band 306 are components of securing means that allow ends of the band 306 to be secured together. In this embodiment, a buckle 310 is provided at one end of the band 306 and a number of holes 312 are provided at the other end.

Turning to FIG. 5a, the strap or band embodiment of FIG. 5 is shown in use. To secure an object 20, the band 306 is wrapped around the object 20 and the prong of the buckle 310 secured into one of the holes and against the frame of the buckle 312 as commonly known in the art, with the magnet 308 in the side of the band 306 away from the object 20. The band 306 is thereby secured around the object 20 with the magnet 308 facing outward. The band 306 can be adjusted to the width of the object 20 by selecting the appropriate hole 312 and securing it with the prong of the buckle 312, thereby securing the object 20.

Though any suitable item can be a secured object 20, the item in this embodiment is a toy rifle capable of firing foam darts. A pair of magnetic securing apparatus with a band or band configuration 304, 304' are depicted because of the length of this particular object 20. The number of securing apparatus 304 used can be greater or lesser, as well as the size of each magnet, 308, 308' depending upon factors such as the size, shape, and weight of the object 20. The respective bands 306, 306' are secured about the object 20, and the magnets 308, 308' are positioned facing the magnetically attractive surface as in other embodiments herein. The magnets 308, 308 are secured against the magnetically attractive surface 10, thereby securing the object. The wraparound band or strap configuration provides extra securement of the object 20 against the magnetically attractive surface.

Turning briefly to FIG. 5B, a single securing apparatus 304 is shown in use to secure a smaller object 20, illustrating that the number of securing apparatus 304 used can be adjusted.

Turning to FIG. 6, another embodiment of a magnetic securing apparatus with a band or strap configuration 304 is shown. This embodiment is much as the embodiment featured in FIGS. 5-5a. However, instead of having a buckle 310 for securement, this embodiment features at least one pin 314 protruding from an end of the band 306 opposite the set of holes 312. The pin 314 is pushed into one of holes 312 selected, thereby securing the band 306 about the object 20.

Turning to FIG. 6A, one possible means of securing the magnet 308 to the band 306 is featured, though as stated, any means of securing known in the art can be used. At least one U-shaped bar 316 is provided on the underside of the magnet 308. In this embodiment, a pair of U-shaped bars are provided on each respective side of the magnet 308 (the U-shaped bar 316 on one end of the magnet is in view). The band 306 is threaded through the at least one U-shaped bar 316, thereby securing the magnet 308 to the band 306.

In another sample embodiment (not shown), the magnet 308 in any strap configuration can have a U-shaped channel along the underside of the magnet facing the band 306. The band can be placed within the u-shaped channel, allowing for a snug fit between the band 306 and magnet 308.

Turning to FIG. 7, another securing embodiment is shown. In this particular embodiment, a band 306 is secured, but this can be used for other suitable configurations such as, for example, webbing or elongated straps. A block 400 is provided. The block 400 has a gap or channel 412 at or in proximity to a lower side of the block 400, and at least one magnet 408 at the upper end of the block 400 relative to the lower end. The block magnet 408 may be attached to the block, or as in this embodiment, incorporated into the block 400, or secured or build in by means in the art. The band 306 can be placed snugly within the gap 412 and the block magnet 408 attached to the magnetically attractive surface 10. By this means, the band 306, and an object 20 secured by the band 306, can be secured to the magnetically attractive surface 10.

The block 400 can be comprised of any suitable material, including, but not limited to, plastic or other resin, a metal, wood, or rubber or rubberized product.

Yet another sample embodiment for securing the ends of the band 306 is shown. One respective end of the band 306 can be threaded through a buckle mechanism 410 at the other end of the band 306, upon which the buckle is clamped or otherwise secured.

Disclosed herein is a device for storing objects such as toys, tools or other suitable sets of objects Accordingly, a device and method of use is provided to users resulting in quick and effortless storage with simple location and retrieval of chosen objects.

It is to be understood that while certain forms of the present invention have been illustrated and described herein, the expression of these individual embodiments is for illustrative purposes and should not be seen as a limitation upon the scope of the invention. It is to be further understood that the invention is not to be limited to the specific forms or arrangements of parts described and shown.

The invention claimed is:

1. A magnetic storage system comprised of:
a magnetically attracted surface, and
at least one magnetic securing apparatus,
wherein the each respective at least one magnetic securing apparatus is comprised of a magnet secured to a single band or strap at approximately the center of the band or strap,
and wherein the at least one magnetic securing apparatus;
(iv) is capable of supporting at least one object while the at least one magnetic securing apparatus it not magnetically attached to the magnetically attracted surface,
(v) is capable of being magnetically attached to the magnetically attracted surface while not supporting the at least one object, and
(vi) is capable of simultaneously supporting the at least one object while being magnetically attached to the magnetically attracted surface,
and wherein the single band or strap is further comprised of either;
a buckle at one end of the band or strap and one or more apertures at the other end of the band or strap,
at least one protruding pin at one end of the band or strap and one or more holes at the other end of the band or strap, or
a buckle mechanism at one end of the band or strap that is capable of clamping the band or strap at or near the other end of the band or strap,
and further comprising a securing apparatus that is either attached to, or incorporated into, the magnetically attracted surface, or a combination thereof,
wherein the securing apparatus is capable of securing the magnetically attracted surface to a second surface larger than the magnetically attracted surface.

2. The magnetic storage system of claim 1, wherein the band or strap is further comprised of a nylon or other plastic or resin, cloth, rubber, a rubberized material, gel, or any combination thereof.

3. The magnetic storage system of claim 1, wherein the magnetic securing apparatus is further comprised of either,
at least one U-shaped bar attached to the underside of the magnet, wherein the U-shaped bar is capable of accepting the band or strap being threaded through the U-shaped bar, or
a U-shaped channel along the underside of the magnet facing the strap or baud that is capable of accepting the strap or band placed within the U-shaped channel.

4. The magnetic storage system of claim 1, wherein the magnetic securing apparatus is further comprised of a block, wherein the block is comprised of
a gap or channel at or in proximity to a lower end of the block and capable of accepting the band or strap,
and wherein the magnet is incorporated into or attached at the upper end of the block relative to the lower end.

5. The magnetic storage system of claim 1, wherein the magnetically attracted surface is comprised of a sheet of steel, other magnetically attractive material, or a sheet of non-magnetic material painted with a magnetically attractive coating.

6. The magnetic storage system of claim 1, wherein the securing apparatus is comprised of a set of screws, anchors, pins, adhesive strips, tap welds, hook and loop fasteners or any combination thereof.

7. The magnetic storage system of claim 1 wherein the at least one magnetic securing apparatus is a pair of magnetic securing apparatus.

* * * * *